United States Patent
Lebeau et al.

(10) Patent No.: US 8,925,292 B2
(45) Date of Patent: Jan. 6, 2015

(54) MOWER-CONDITIONER WITH BROAD SPREADER

(75) Inventors: Jonathan Lebeau, Dijon (FR); Heinrich Tepe, Gray (FR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/107,297

(22) Filed: May 13, 2011

(65) Prior Publication Data

US 2012/0117932 A1    May 17, 2012

(30) Foreign Application Priority Data

May 20, 2010 (DE) .......................... 10 2010 029 191

(51) Int. Cl.
*A01D 61/00* (2006.01)
*A01D 43/10* (2006.01)

(52) U.S. Cl.
CPC .................................. *A01D 43/107* (2013.01)
USPC ..................................................... 56/16.4 A

(58) Field of Classification Search
USPC ....... 56/16.4 A, 16.4 R, 255, 256, 320.1, 504, 56/505, 192, DIG. 1, DIG. 9, DIG. 20; 460/111, 112, 8, 901
See application file for complete search history.

(56) References Cited

U.S. PATENT DOCUMENTS

| | | | | |
|---|---|---|---|---|
| 2,708,582 A * | 5/1955 | Adams | | 239/650 |
| 2,865,416 A * | 12/1958 | Hetteen | | 241/238 |
| 3,015,927 A * | 1/1962 | Caldwell | | 56/15.9 |
| 3,059,403 A * | 10/1962 | Bamford et al. | | 56/366 |
| 3,092,946 A * | 6/1963 | Mathews | | 56/14.9 |
| 3,106,052 A * | 10/1963 | Ingram | | 56/1 |
| 3,383,844 A * | 5/1968 | Glass et al. | | 56/14.4 |
| 3,523,410 A * | 8/1970 | Taylor et al. | | 56/10.2 R |
| 3,721,073 A * | 3/1973 | Scarnato et al. | | 56/16.4 B |
| 3,754,384 A * | 8/1973 | Case et al. | | 56/14.4 |
| 3,803,821 A * | 4/1974 | Peacock et al. | | 56/192 |
| 3,841,070 A * | 10/1974 | Scarnato et al. | | 56/14.4 |
| 3,881,301 A * | 5/1975 | Sawyer et al. | | 56/14.4 |
| 4,510,948 A * | 4/1985 | Dekeyzer | | 460/112 |
| 4,532,941 A * | 8/1985 | Gauthier | | 460/112 |
| 5,930,988 A * | 8/1999 | Hanson | | 56/16.4 A |
| 6,775,968 B2 * | 8/2004 | Carlot et al. | | 56/192 |
| 6,840,854 B2 * | 1/2005 | Redekop | | 460/112 |
| 6,939,221 B1 * | 9/2005 | Redekop et al. | | 460/111 |
| 7,337,599 B2 * | 3/2008 | Wilhelm | | 56/16.4 R |
| 7,736,218 B2 * | 6/2010 | Mayerle et al. | | 460/112 |
| 2004/0221562 A1 * | 11/2004 | Snider | | 56/16.4 R |

FOREIGN PATENT DOCUMENTS

| | | |
|---|---|---|
| DE | 2007511 A1 | 9/1971 |
| DE | 3827236 C1 | 2/1989 |
| DE | 19736978 A1 | 3/1999 |
| EP | 1310149 | 5/2003 |

OTHER PUBLICATIONS

German Search Report dated Jun. 10, 2014 (7 pages).

* cited by examiner

*Primary Examiner* — Thomas B Will
*Assistant Examiner* — Mai Nguyen

(57) ABSTRACT

A mower-conditioner is provided having guide elements that protrude into the crop material flow. The guide elements make it possible to influence the direction of the trajectory of the cut crop material. Each guide element can be mounted on at least one component of the mower-conditioner by way of the least one holder. At least one component contains openings, through which at least one holder can be inserted into and/or fitted in the component.

3 Claims, 6 Drawing Sheets

MOWER-CONDITIONER WITH BROAD SPREADER

FIELD OF THE INVENTION

The invention pertains to a mower-conditioner with guide elements that protrude into the material flow and make it possible to influence the direction of the cut material. Each guide element can be mounted on at least one component of the mower-conditioner by way of at least one holder.

BACKGROUND OF THE INVENTION

In agricultural mower-conditioners, the crop cut by the cutter bar is subjected to a mechanical treatment in a conditioning device in order to accelerate the drying thereof. During this process, the evaporation-inhibiting wax layer is partially destroyed by breaking or crushing. The crop is ejected rearward and preferably not deposited in the form of a windrow, but rather broadly distributed behind the vehicle such that it can dry quickly. This is accomplished with a broad spreader, in which the direction of the trajectory of the cut material can be influenced by way of guide elements. In conventional broad spreaders, the guide elements are usually screwed to components of the mower-conditioner by holders. Upstream mounting points, in particular, are difficult to access such that it is difficult to tighten or loosen the screw connections.

European Patent Application EP 1 310 149 A1 discloses a mower-conditioner, in which a broad spreader is positioned behind a treatment unit and the directional baffles are rigidly attached to the broad spreader. Depending on the respective requirements, the broad spreader can be pivoted down into the material flow in order to influence the trajectory. In this downwardly pivoted position, components under the protective cover are no longer accessible. Individual guide elements cannot be attached or removed.

SUMMARY OF THE INVENTION

The invention is based on the objective of designing the broad spreader of a mower-conditioner in such a way that the guide elements can be attached and removed with a low expenditure of time.

According to the invention, openings are produced in one component. In this case, the component may already be provided with openings during the manufacturing process or the openings may be subsequently produced by cutting out the material. The openings may be embodied in the form of holes, slots, bores, guides and the like, through which a holder of a guide element can be inserted. The holder protrudes through the opening. The guide element is fixed due to an abutment of the holder.

The opening may either be larger or smaller relative to the dimensions of the holder.

If the opening is larger, the holder can be fitted on the component through the opening. It lies on the component. The force effect is achieved due to the weight of the guide element. The underside of the holder is supported by the component. In one advantageous embodiment of the invention, a device additionally acts upon the upper side of the holder such that it is pressed against the component. For example, a weight may serve as such a device. It is particularly advantageous to utilize a device, in which a plate is pressed against the upper side of the holder by a tension element, preferably a spring. However, the plate itself may act as a tension element, e.g., in the form of a leaf spring or spring steel sheet or in the form of a plastic or rubber strip with internal tension. Several guide elements may be provided with a common device or each guide element may be respectively provided with its own device. The guide element may also be provided with a snap-in mechanism that anchors the guide element in the component such that it can no longer tilt. Furthermore, a substantial material thickness or a corresponding shape of the component in the region of the opening also prevents the guide element from carrying out significant movements.

The opening may also be embodied smaller than the holder. In this case, an interference fit is produced between the holder and the opening. The holder is pressed into, the opening such that it is wedged between the walls of the opening and thusly fixed.

Due to the inventive mounting principle, the guide elements can be easily mounted on the front without the use of tools. Consequently, it is possible to quickly and precisely attach and remove the guide elements without requiring additional mounting means such as, for example, screws or pins in the front region.

The holder may have different shapes. It may be embodied, for example, in the form of an angle. A pin with a widened head can also be used as holder. It is important that the shapes of the opening and of the holder are adapted to one another. In this respect, the above-described active mounting principles, i.e., abutting or wedging, need to be observed.

The holder may consist of separate elements, with the attachment of these elements on the guide element being realized by means of screws, rivets, bonding, welding, etc.

In one particularly preferred embodiment of the invention, a section of the guide element serves as holder. The holder is formed by the guide element. The holder and the guide element consequently are embodied in one piece such that a particularly stable construction is achieved. In this context, it is particularly advantageous if the guide element is bent by 90° on one end and thus forms a holder in the form of an angle that can be positioned in a correspondingly adapted opening. However, the holder may also be embodied in the form of a lug, a shaft, etc. that is formed by or on the guide element and protrudes forward in order to be inserted into an opening in the component.

The inventive broad spreader causes a broad distribution of the crop behind the mower-conditioner. For this purpose, the guide elements deflect the material flow in the horizontal direction. The guide elements in the form of plates are largely arranged vertically in the material flow and extend rearward. An adjustment of the angle of the plates relative to the driving direction makes it possible to vary the width over which the cut material is deposited. In this way, the cut material can be influenced in the horizontal direction.

The mounting of the guide element is preferably embodied with two holders. In this case, one holder is arranged at an upstream location in the material flow. This usually concerns the front holder referred to the driving direction, i.e., the upstream holder. According to the invention, this holder can be inserted into and/or fitted in the component through openings. This simplifies the attachment because this part of the mower-conditioner is difficult to access. The rotor arranged in this region, in particular, complicates the positioning of separate mounting elements such as screws. However, the downstream holder or rear holder referred to the driving direction usually is easily accessible such that an attachment with mounting elements can be easily realized. The guide elements may be mounted, for example, frictionally against a spring force or with screws, clamping jaws, etc., that are inserted through slot-shaped openings in the component. In this case, it is possible to vary the angle of the guide elements relative to the driving direction and therefore the horizontal deflection of the cut material. A single person can now take hold of the guide, element in the region of the rear holder, insert the guide element with its front holder and ultimately mount the guide element with the accessible rear holder.

The guide elements are preferably mounted on components, past which the material flow is at least sectionally guided, wherein it is particularly advantageous if these components are arranged above the material flow, because then the guide elements are suspended in the material flow due to their own weight. The frame, into which the guide elements can be inserted and/or fitted, may be considered for this purpose. Other particularly advantageous mounting options are cover plates or protective covers positioned above the material flow. The cover plates are usually made of sheet metal that can be easily processed and in which cut-outs for realizing the openings can be easily produced. Since this does not concern any supporting components, the stability of the mower-conditioner is not jeopardized by producing the openings.

BRIEF DESCRIPTION OF THE DRAWINGS

The invention is described in detail below with reference to the accompanying drawings wherein.

DESCRIPTION OF THE PREFERRED EMBODIMENT

Figure 1:
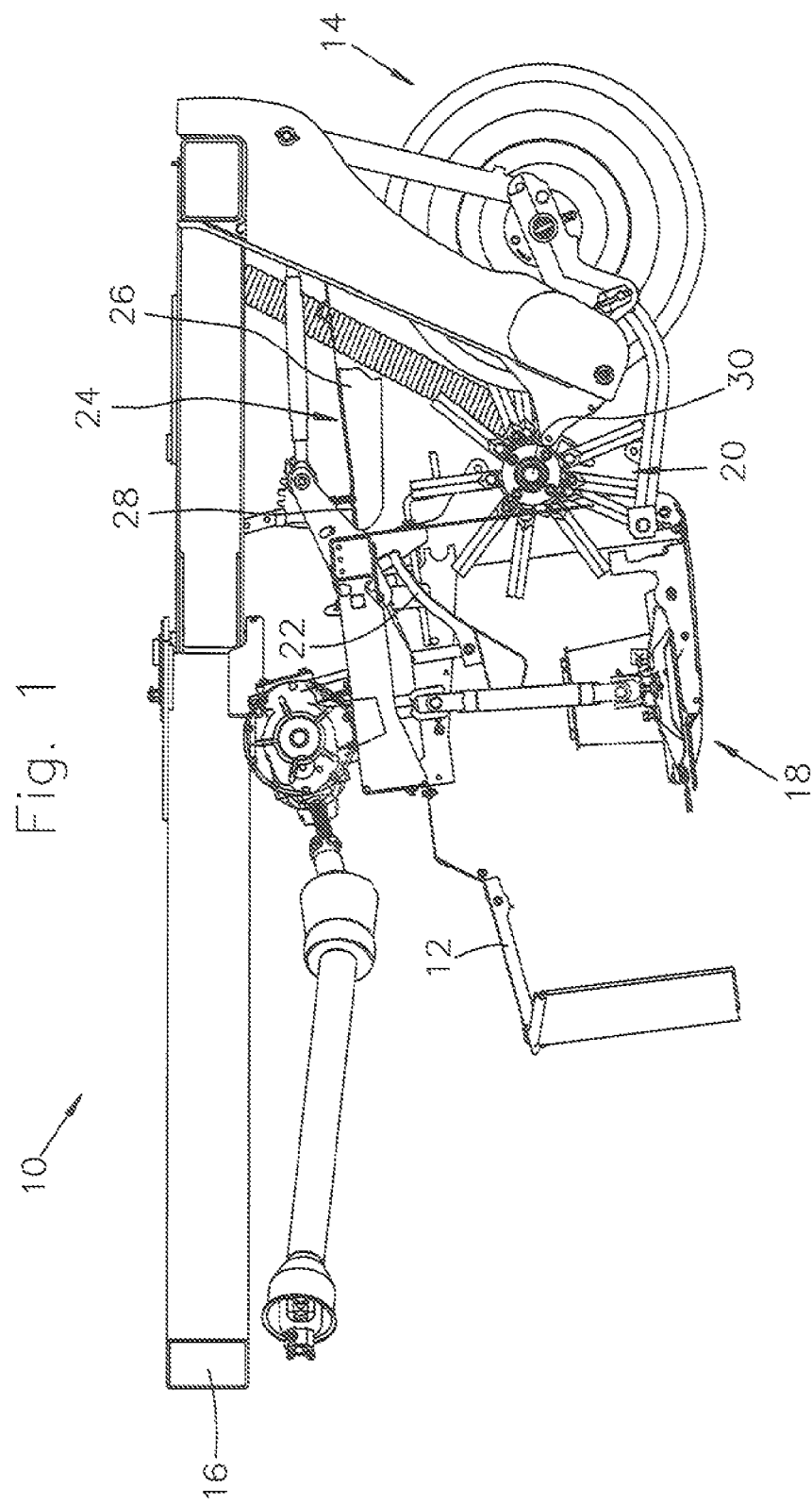
FIG. 1 is a schematic side view of a mower-conditioner with a broad spreader.

FIG. 1 shows a mower-conditioner 10 with a housing 12, an undercarriage 14, a drawbar 16, a cutter bar 18, a rotor 20 that acts as conditioning device, a material guiding device 22 and a broad spreader 24.

Upright crop material is separated from the ground by the cutter bar 18 and then moves rearward, wherein said material is then lifted by the rotor 20 rotating in the clockwise direction referred to the drawing and conveyed to the broad spreader 24 along the material guiding device 22. The material guiding device 22 has the function of initially keeping the cut material engaged with the rotor 20 and squeezing said material into a gap between the rotor 20 and the material guiding device 22 such that the inhomogeneous material is abraded and conditioned for the drying process. The material is subsequently conveyed downstream after it separates from the rotor 20, wherein the broad spreader 24 guides the material flow.

The broad spreader 24 is arranged above the rotor 20 and extends rearward referred to the driving direction from a point that lies in the vertical extension above the rotational axis 30 of the rotor 20. The broad spreader 24 comprises guide elements 26 that are mounted on a component 28. In the embodiment, the component 28 is embodied in the form of a rectangular or trapezoidal cover plate that is arranged horizontally and acts like a hood. The longer side of the component 28 extends parallel to the axis 30 of the rotor 20. In the embodiment, the guide elements 26 are embodied in the form of vertically aligned plates or baffles that influence the trajectory and the direction or spreading of the cut material in the horizontal direction.

The material flow is conveyed between the rotor 20 and the material guiding device 22, wherein the material flow usually is initially conveyed past the underside of a frame 32 embodied in the form of a hollow cuboid and then past the underside of the component 28 embodied in the form of a plate. The component 28 seamlessly adjoins the rearward-facing side of the frame 32 and is connected thereto.

Figure 2:
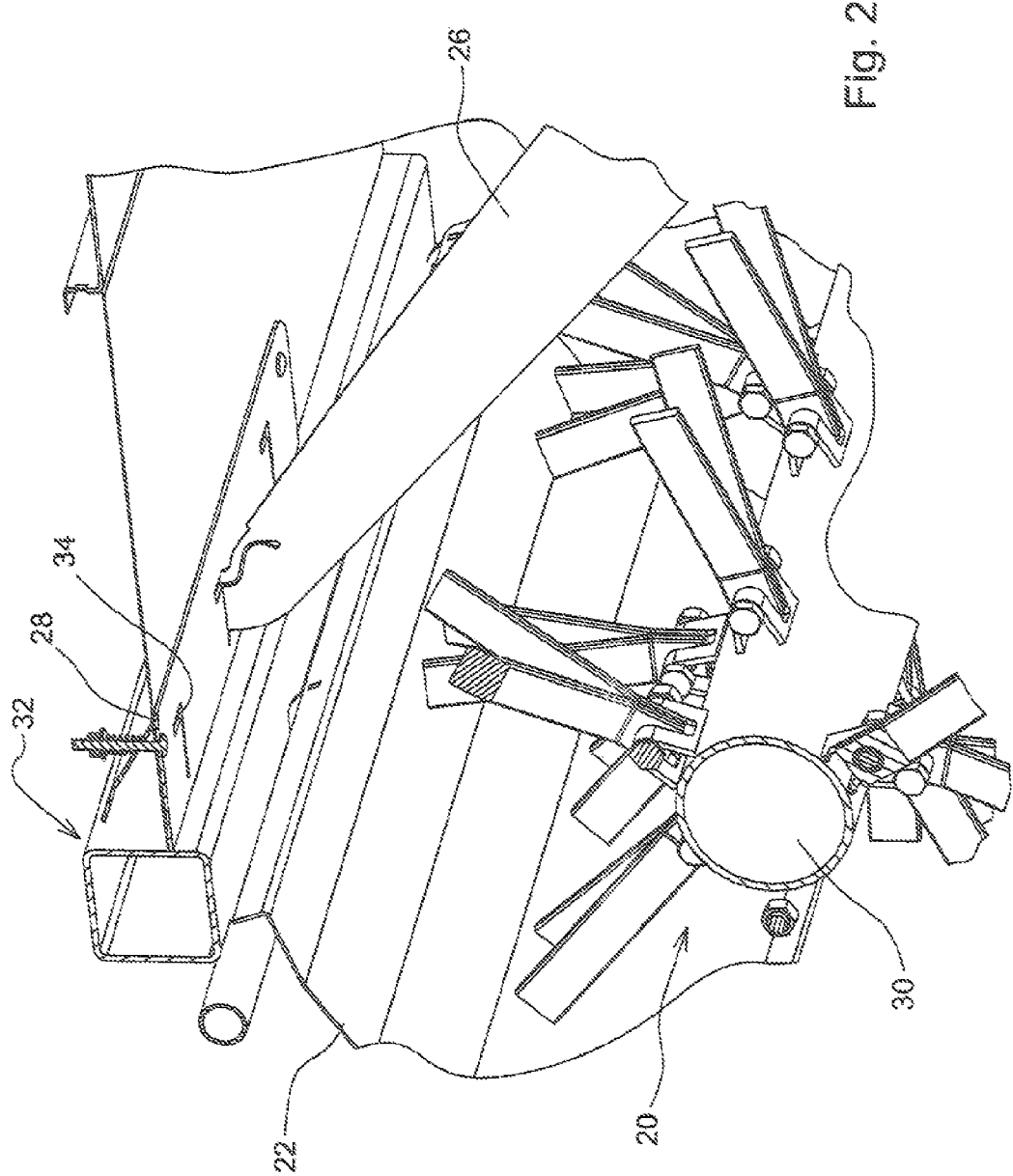
FIG. 2 is a perspective bottom view of part of the rotor.

As shown in FIG. 2 openings 34 are produced in the component 28. The openings consist L-shaped cut-outs in the component 28. A section of a guide element 26 is respectively inserted into each opening 34. After the guide elements 26 have been mounted, one section of each guide element 26 is consequently positioned above the component 28 while the section that influences the trajectory extends below the component 28.

Figure 3:
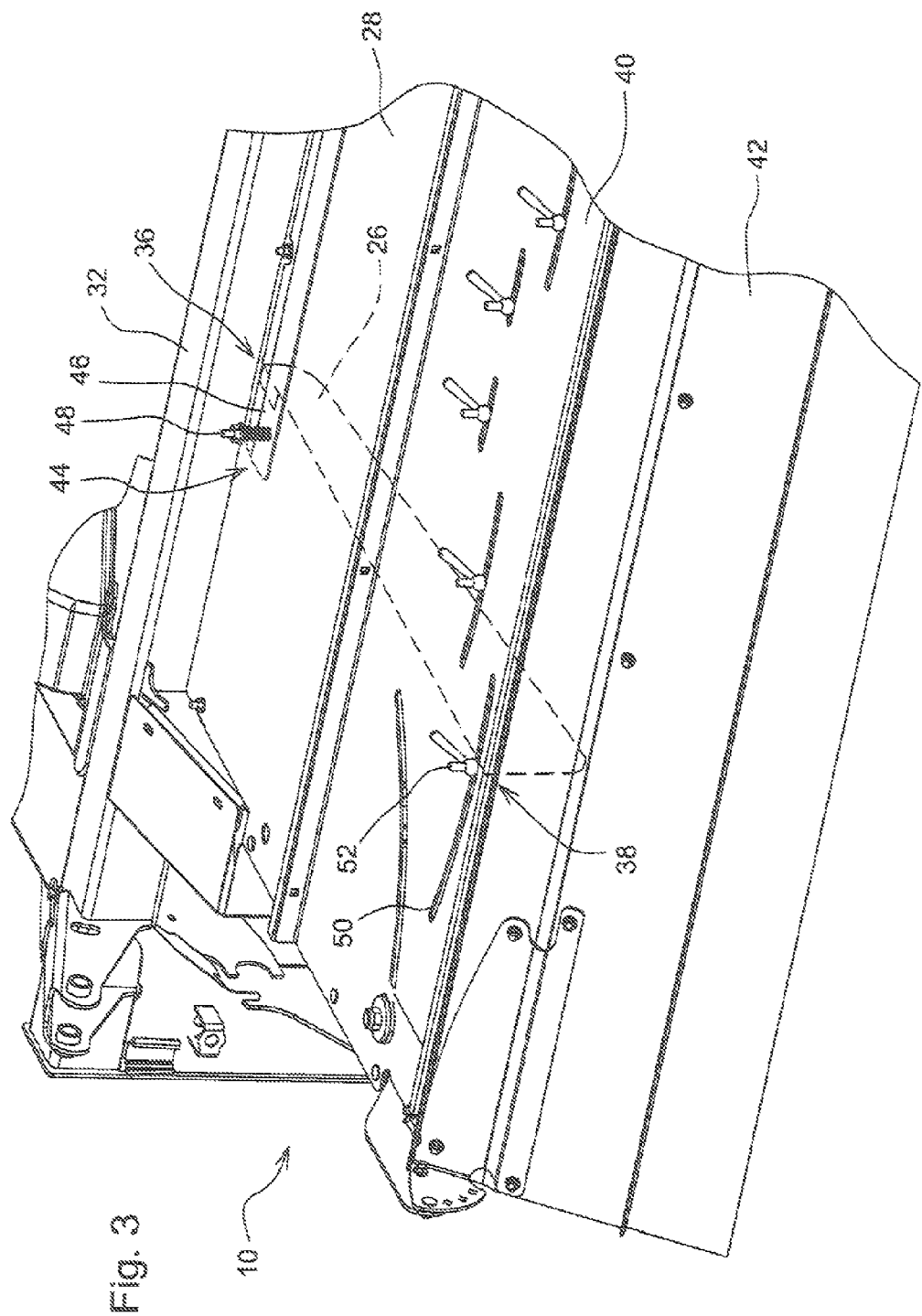
FIG. 3 is a perspective view of the rear section of the mower-conditioner.
Figure 4:
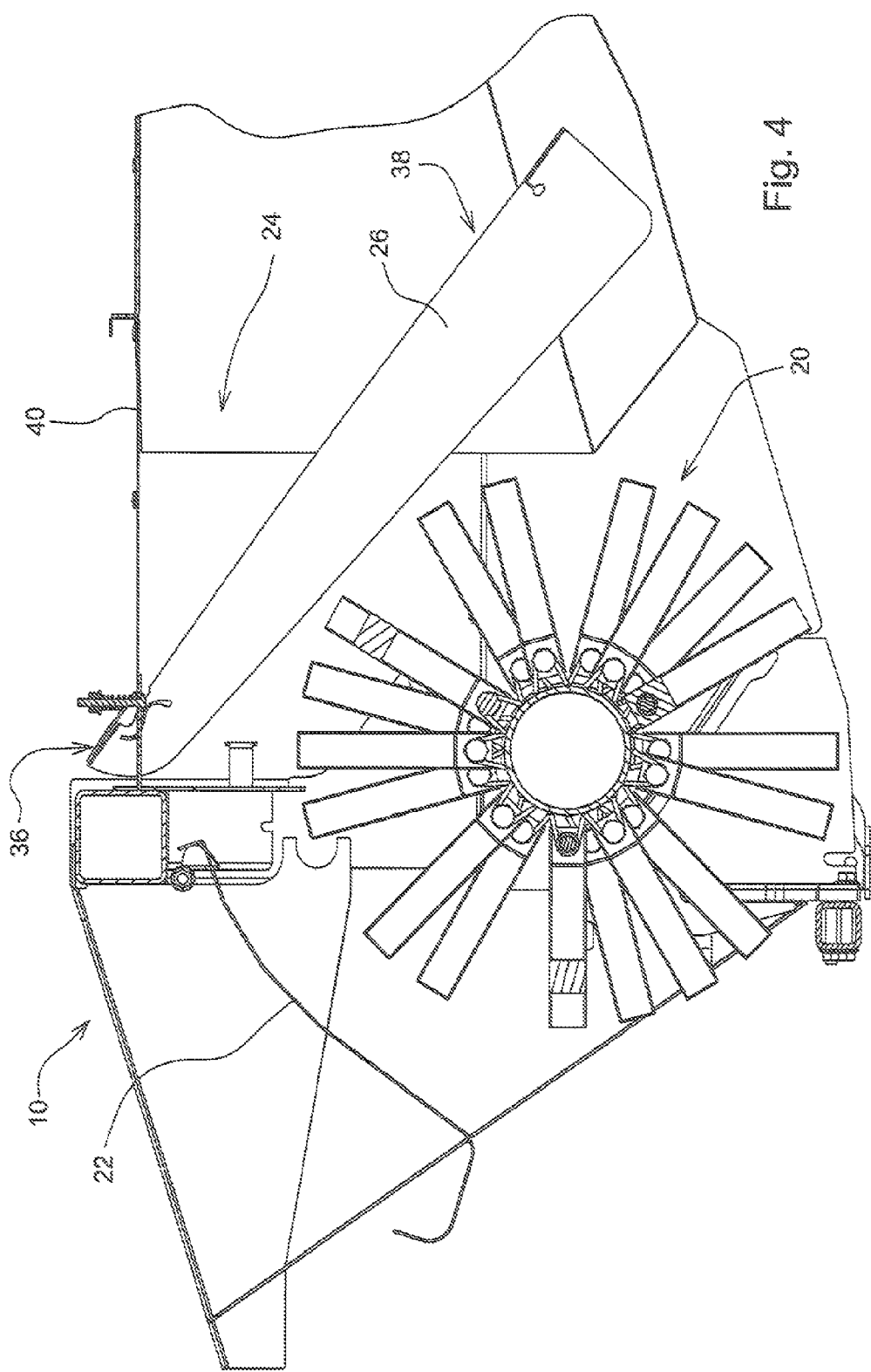
FIG. 4 is a side view of the rotor, the material guiding device and the broad spreader.

As shown in FIGS. 3 and 4 each guide element 26 is mounted by means of two holders 36, 38. In this case, one holder 36 is inserted into and/or fitted in the front component 28 through an opening 34 while the other holder 38 is screwed to a rear component 40. The two components 28, 40 consist of successively arranged horizontal plates that are connected to one another, but may also be realized in one piece in another embodiment. A suspended plate 42 that covers the ejection opening is situated adjacent to the rear component 40.

Figure 5:
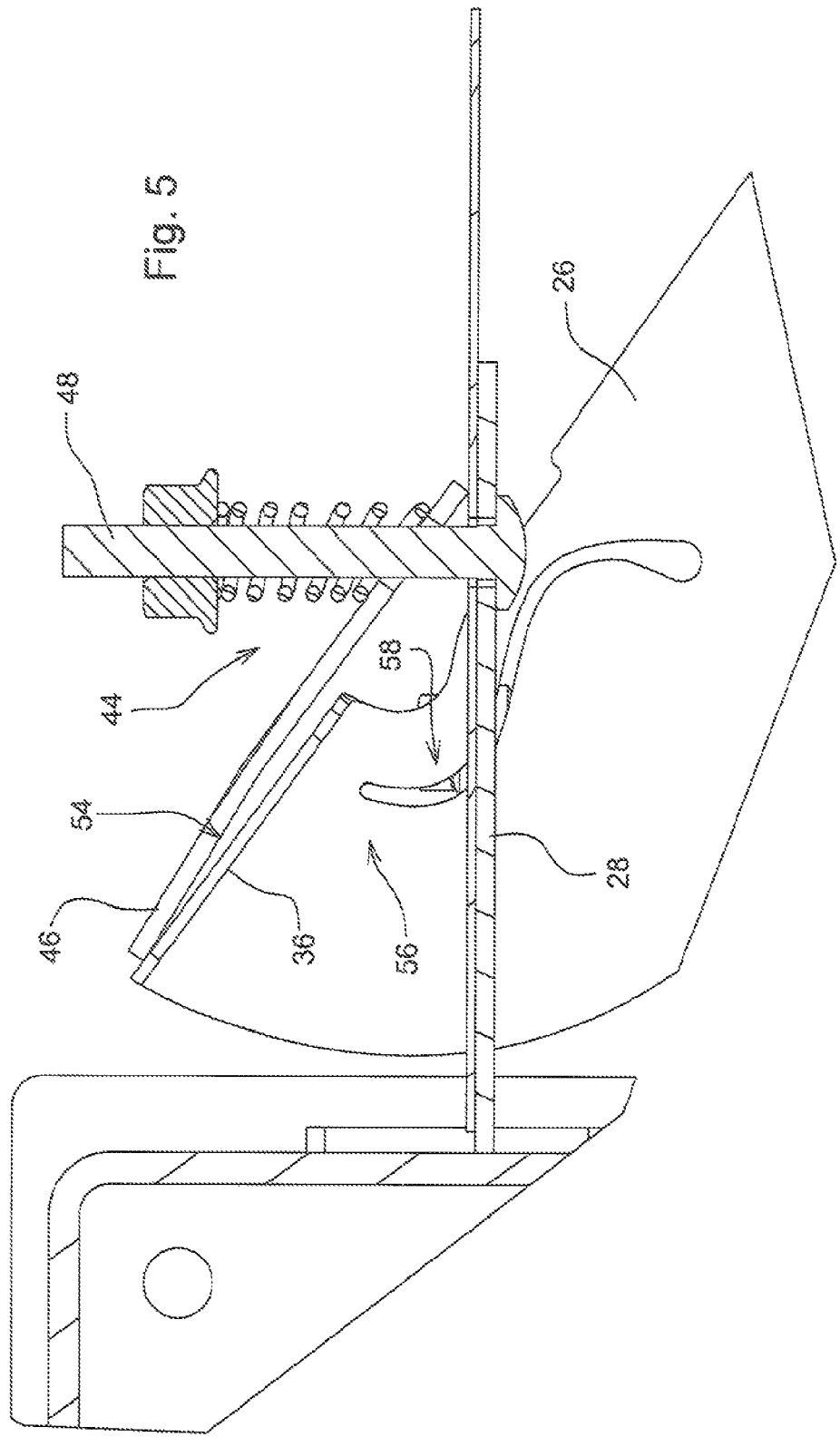
FIG. 5 is an enlarged detail of the device for fixing the holder shown in FIG. 4.
Figure 6:
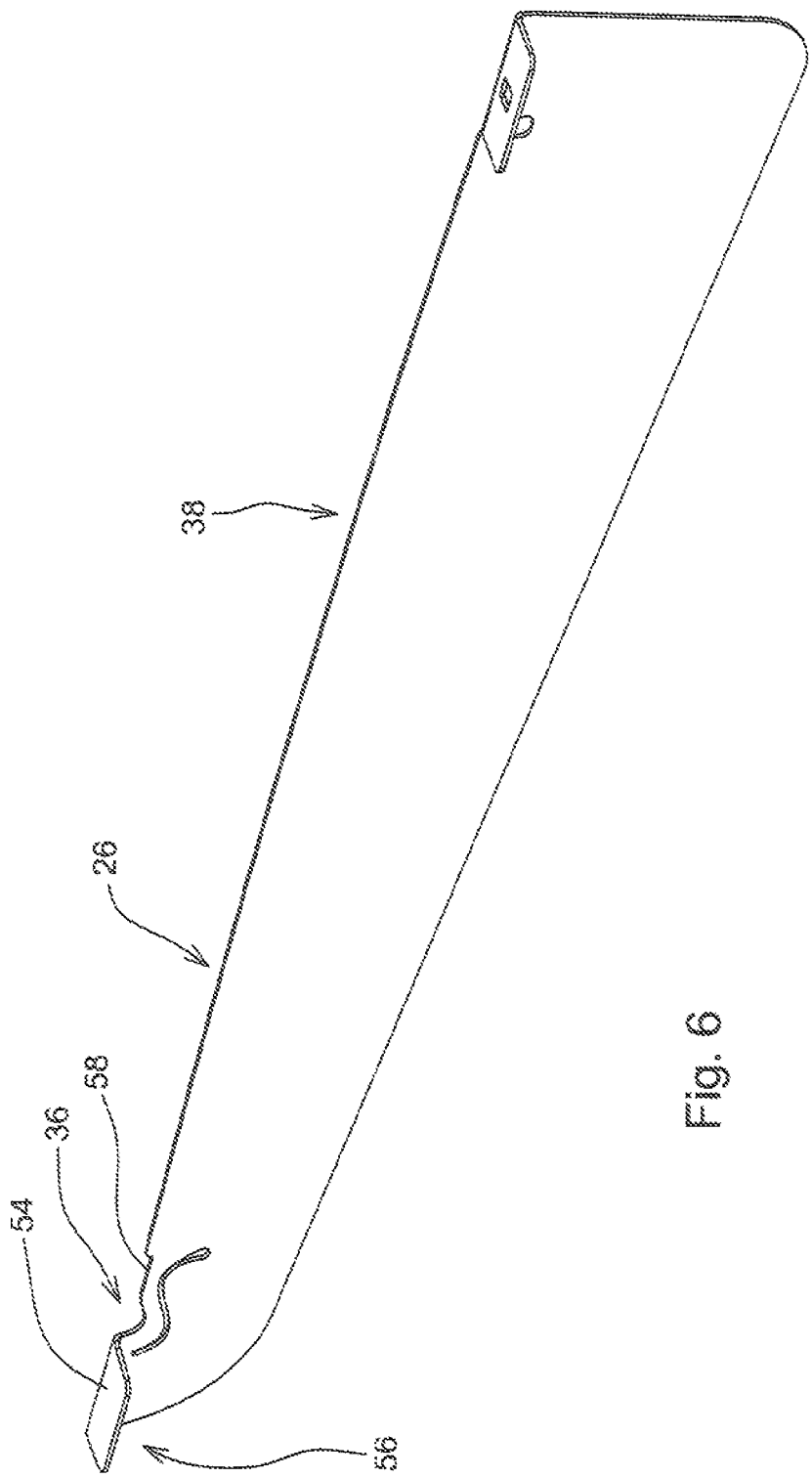
FIG. 6 shows a perspective view of a guide element.

As is perhaps best shown in FIGS. 5 and 6 the guide element 26 is embodied in the form of a plate. Angles are integrally formed onto its front and rear ends in order to form holders 36, 38 for mounting the guide element 26. Directly behind the front holder 36, the guide element 26 is provided with a serpentine cut-out 58 that extends, along the holder. The front holder 36 has a length of approximately 5 cm and extends above the contour of the remaining guide element 26 with its angled section such that this angled section that serves as the holder 36 is arranged above the component 28, but the remainder of the guide element can be arranged below the component 28. The holder 38 can, but does not necessarily have to, extend over the entire length of the guide element 26 that may amount to 50 to 100 cm and is made of sheet metal.

As shown in FIG. 3 slot-shaped openings 50 that extend in the shape of an arc are arranged in the rear component 40. The arc extends along the horizontal swinging arc of the respective guide element 26 about its front mounting point. A mounting element 52 is inserted through a bore in the rear holder and the opening 50 in order to mount a guide element 26, wherein the mounting element preferably consists of a screw for fixing the guide element 26 in the desired position by means of a rear holder 38. The horizontal direction of the cut material is varied by changing the mounting point along the slot-shaped openings 50.

The broad spreader 24 comprises guide elements 26 that are mounted on the components 28, 40. The guide elements 26 are attached by inserting their front regions through the openings 34. The guide elements 26 are then pivoted upward in the direction of the arrow shown in FIG. 4 such that they carry out a rotational movement about the front mounting point. The guide elements 26 are then fixed, by means of their rear holder 38, with mounting elements 52 on the rear component 40.

A device 44 above the front component 28 presses against the upper side 54 of the holder 36 such that the holder is pressed against the component 28. The device 44 comprises a plate 46 that is pressed against the component 28 by a tension element 48, preferably a spring. The holder 36 is clamped between the component 28 and the plate 46. The underside 56 of the holder 36 is supported by the component 28. The plate 46 extends over the entire width of the component 28 and therefore covers all guide elements 28.

According to the preceding description, the guide element 26 is mounted by obliquely or vertically pushing its holder 36 of L-shaped cross section through the L-shaped opening 34 while pivoting its rear end upward. In the resulting position the holder 36 is situated on the upper side of the component 28 and in contact with the underside of the plate 44. The tension element 48 is acted upon by the holder 36 that pushes between the component 28 and the plate 44 and presses the holder 28 against the upper side of the component 28. The plate 44 simultaneously acts upon all inserted guide elements 28. However, the latter is not absolutely imperative; in fact, it would be possible to provide or completely forgo a separate plate 44 and a separate tension element 48 for each guide element 28 depending on the available clearance.

Having described the preferred embodiment, it will become apparent that various modifications can be made without departing from the scope of the invention as defined in the accompanying claims.

The invention claimed is:

1. A mower-conditioner having guide elements that protrude into a crop material flow influencing the direction of the cut material, wherein each guide element is mounted on a hood of the mower-conditioner by way of an upstream retainer and a downstream retainer, wherein openings are provided in the hood wherein each of the upstream retainers is fitted into and supported by one of said openings of the hood and each of the downstream retainers is fixed by a fastening element downstream in the hood, wherein a device presses the upstream retainer against the hood.

2. A mower-conditioner having guide elements that protrude into a crop material flow influencing the direction of the cut material, wherein each guide element is mounted on a hood of the mower-conditioner by way of an upstream retainer and a downstream retainer, wherein openings are provided in the hood wherein each of the upstream retainers is fitted into and supported by one of said openings of the hood and each of the downstream retainers is fixed by a fastening element downstream in the hood, wherein a section of the guide element serves as the upstream retainer.

3. A guide element for a mower-conditioner, the guide element being positioned in a material flow such that the direction of cut material is influenced, and the guide element having an upstream retainer and a downstream retainer for mounting the guide element on a hood of the mower-conditioner, wherein the upstream retainer is one of inserted into and fitted in openings in the hood, wherein a section of the guide element forms the upstream retainer.

* * * * *